United States Patent
Scott et al.

(10) Patent No.: US 9,656,318 B2
(45) Date of Patent: May 23, 2017

(54) METHODS FOR JOINING MORE THAN TWO PANELS TOGETHER AND ASSEMBLIES FORMED BY THE METHODS

(71) Applicant: FORD GLOBAL TECHNOLOGIES, LLC, Dearborn, MI (US)

(72) Inventors: Jason Douglas Scott, Farmington Hills, MI (US); Aindrea McKelvey Campbell, Beverly Hills, MI (US); Amanda Kay Freis, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/974,004

(22) Filed: Dec. 18, 2015

(65) Prior Publication Data

US 2016/0101459 A1   Apr. 14, 2016

Related U.S. Application Data

(62) Division of application No. 14/105,995, filed on Dec. 13, 2013, now Pat. No. 9,249,816.

(51) Int. Cl.
*B65D 65/02* (2006.01)
*B21J 15/02* (2006.01)
(Continued)

(52) U.S. Cl.
CPC .......... *B21J 15/025* (2013.01); *B21D 35/007* (2013.01); *B21D 39/031* (2013.01); *B32B 7/08* (2013.01); *B32B 15/016* (2013.01); *B62D 65/02* (2013.01); *F16B 5/04* (2013.01); *F16B 5/045* (2013.01); *F16B 19/086* (2013.01); *B32B 2250/03* (2013.01); *B32B 2605/08* (2013.01); *Y10T 29/49835* (2015.01); *Y10T 29/49837* (2015.01);
(Continued)

(58) Field of Classification Search
CPC ...... B21D 35/007; B21D 39/031; B32B 7/08; B62D 65/02; F16B 5/04; F16B 5/045; Y10T 29/49904; Y10T 29/49837; Y10T 29/49943; Y10T 29/49956; Y10T 29/49835; Y10T 403/4966
See application file for complete search history.

(56) References Cited

U.S. PATENT DOCUMENTS

| | | | |
|---|---|---|---|
| 6,769,595 | B2 | 8/2004 | Stol et al. |
| 2012/0177459 | A1 | 7/2012 | Carlsson |

FOREIGN PATENT DOCUMENTS

WO   95/35174   12/1995

OTHER PUBLICATIONS

Roger Andersson et al., Self-Pierce Riveting Through 3 Sheet Metal Combinations, AIP Confrence Proceedings, vol. 1353, 2011.
(Continued)

*Primary Examiner* — Jermie Cozart
(74) *Attorney, Agent, or Firm* — Damian Porcari; Brooks Kushman P.C.

(57) ABSTRACT

An assembly for a vehicle and a method of making an assembly including more than three panels stacked together and joined by self-piercing rivets or by clinch joints. A first panel and a second panel are joined together at a first attachment point. A third panel and the first panel are joined together at a second attachment point. A fourth panel and the third panel are joined together at a third attachment point. The first, second and third attachment points are spaced apart to avoid interference between the self-piercing rivets or the clinch joints.

6 Claims, 2 Drawing Sheets

(51) Int. Cl.
  *F16B 5/04*      (2006.01)
  *F16B 19/08*     (2006.01)
  *B62D 65/02*     (2006.01)
  *B21D 35/00*     (2006.01)
  *B21D 39/03*     (2006.01)
  *B32B 7/08*      (2006.01)
  *B32B 15/01*     (2006.01)

(52) U.S. Cl.
  CPC .... *Y10T 29/49904* (2015.01); *Y10T 29/49943* (2015.01); *Y10T 29/49956* (2015.01); *Y10T 403/4966* (2015.01)

(56) References Cited

OTHER PUBLICATIONS

Mahen Mahendran et al., Strength of Self Piercing Riveted Connections, 5th International Conference on Advances in Steel Structures. Singapore, Dec. 5-7, 2007.
Austin Weber, Self-Piercing Rivets, Assembly, Sep. 1, 2002.

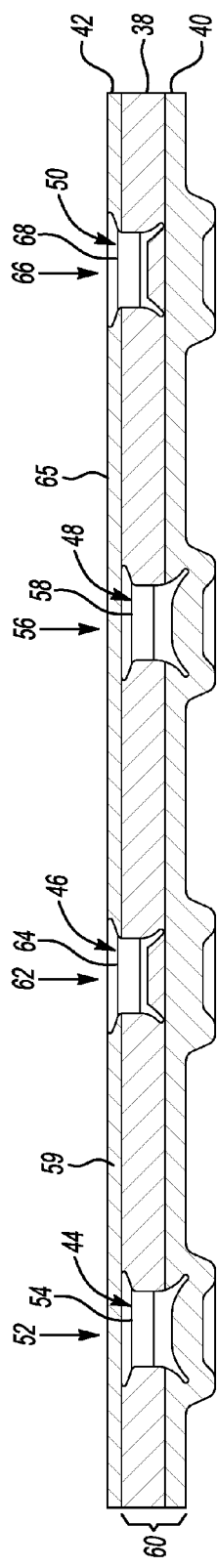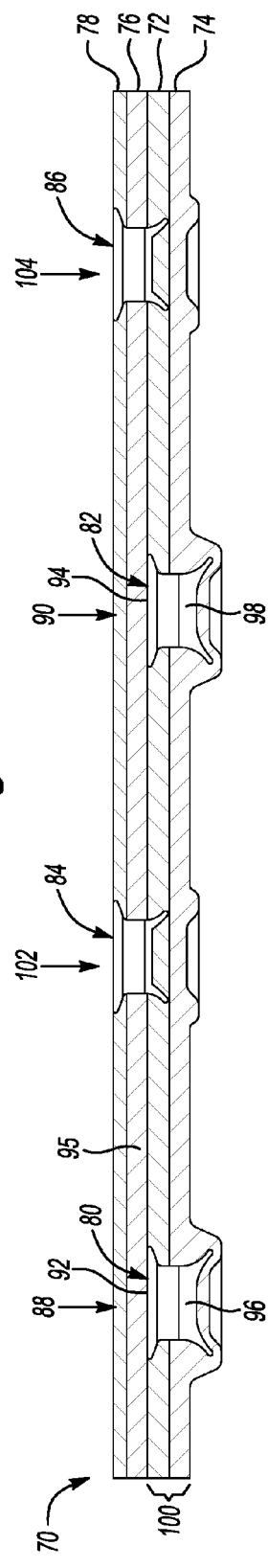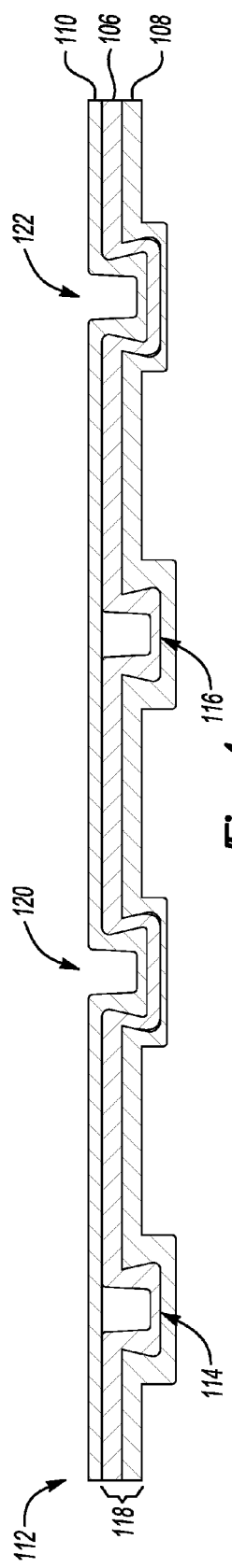

METHODS FOR JOINING MORE THAN TWO PANELS TOGETHER AND ASSEMBLIES FORMED BY THE METHODS

CROSS-REFERENCE TO RELATED APPLICATIONS

This application is a division of U.S. application Ser. No. 14/105,995 filed Dec. 13, 2013, now U.S. Pat. No. 9,249,816 B2 the disclosure of which is hereby incorporated in its entirety by reference herein.

TECHNICAL FIELD

The present disclosure relates to several methods for joining more than two panels together and assemblies formed by the methods.

BACKGROUND

In automotive manufacturing, lightweight materials, such as aluminum, are used to produce fuel efficient vehicles. Sheet metal components are joined together by welding or by using rivets, such as a self-piercing rivet tool 20 shown in FIGS. 1A-1D during a body-in-white stage in vehicle manufacturing. Referring to FIG. 1A, a self-piercing rivet tool 20 has a nose 22 that surrounds a punch 24. A rivet 26 is carried by the tool 20. The rivet 26 has a tubular body with a tapered end. In FIG. 1B, a self-piercing rivet 26 is shown engaging two panels 28 and 30. The nose 22, punch 24, and rivet 26 are positioned on one side of the panels 28 and 30, and a die 32 is positioned on the opposite side of the panels 28 and 30. Referring to FIG. 1C, the punch 24 drives the rivet 26 into the panels 28 and 30 until the rivet 26 penetrates through the panel 28 into panel 30. The rivet 26 is flared to expand into the bottom panel 30 and the rivet 26 forms a button on the bottom panel 30. Referring to FIG. 1D, the nose 22 and the punch 24 are retracted from the rivet 26. A head 34 of the rivet 26 is flush with the top surface of the top panel 28.

The thickness and the number of panels to be joined by the rivet and the length of the rivet may affect the strength of the interlock provided by the rivet. Where more than two sheets of metal are joined, a rivet may not flare sufficiently. This may result in achieving only a weak interlock between the panels. Adhesives may be used with rivets to improve the strength of the interlock between panels. However, adhesives require time to cure and a weak rivet connection may allow the panels to shift positions before the adhesive cures. Riveting three or more panels together with a single rivet requires a longer rivet. The problem with longer rivets is that they may break through the button in the bottom layer. If the rivet joint is reinforced with adhesive, the adhesive may contaminate the riveting equipment. Production downtime may be incurred for cleaning the riveting equipment.

The above problems and other problems are addressed by this disclosure as summarized below.

SUMMARY

According to one aspect of this disclosure, a method is provided for attaching a plurality of panels together. The method comprises assembling a first panel and a second panel together in a face-to-face relationship and fastening the first panel and the second panel at a first attachment point to form a sub-assembly. The method continues by assembling a third panel over the first panel covering the first attachment point and fastening the third panel and the sub-assembly at a second attachment point that is spaced from the first attachment point.

According to another aspect of this disclosure, the step of fastening the first panel and the second panel to form the sub-assembly may further include inserting a first self-piercing rivet into the first panel in an area of the first panel that does not have a pre-drilled a hole. The self-piercing rivet may have a head that is driven into the first panel to be flush with a top surface of the first panel.

The step of fastening the third panel and the sub-assembly may include the further step of inserting a second self-piercing rivet into the third panel and the first panel at the second attachment point. The method may further include the step of assembling a fourth panel over the third panel and inserting a third self-piercing rivet into the fourth panel and the third panel at a spaced location from the first self-piercing rivet and the second self-piercing rivet. The rivet connecting the fourth panel may be a longer rivet that is inserted into three or more panels.

According to a further aspect of the method, the step of fastening the first panel and the second panel may include clinching the first panel to the second panel and the step of fastening the third panel and the sub-assembly may include clinching the third panel to the sub-assembly.

According to another aspect of the method of this disclosure, a method is disclosed for assembling multiple parts. The method comprises inserting a first plurality of rivets into a first flange and a second flange in a first set of locations. A third flange is assembled over the first plurality of rivets in the first flange and a second plurality of rivets is inserted into the third flange and the first flange without penetrating the second flange in a second plurality of locations that are spaced from the first set of locations.

The method may further comprise assembling a fourth flange over the second plurality of rivets in the third flange and inserting a third plurality of rivets into the fourth flange and the third flange without penetrating the first flange. The rivets securing the fourth flange may be inserted into three flanges. The second plurality of rivets have heads that are flush with a top surface of the third flange.

According to an additional aspect of this disclosure, a method is disclosed for assembling multiple parts. The method comprises the steps of clinching a first flange and a second flange in a first set of locations. Assembling a third flange over the first flange and clinching the third flange and the first flange in a second plurality of locations that are spaced from the first set of locations.

Other aspects of the method may further comprise the additional steps of assembling a fourth flange over the third flange and clinching the fourth flange and the third flange in a third plurality of locations that are spaced from the second plurality of locations.

According to another aspect of this disclosure, an assembly is disclosed that comprises at least three parts that are assembled with self-piercing rivets. The first part and the second part overlap in a first overlap area. The third part overlaps the first part in a second overlap area. A first self-piercing rivet is inserted through the first overlap area to join the first and second parts. A second self-piercing rivet is inserted through the second overlap area to join the first and third parts with the third part covering the first self-piercing rivet.

According to further aspects of the assembly, a fourth part may be provided that overlaps the third part in a third overlap area. A third self-piercing rivet is inserted through the third overlap area to join the third and the fourth part. If the third self-piercing rivet is longer, it may be inserted through the first part in addition to the third and fourth parts.

An alternative aspect of this disclosure relates to an assembly of three or more parts that are joined together with a plurality of clinch joints. A first part and a second part are assembled together to overlap in a first overlap area. A third part overlaps the first part in a second overlap area. A first clinch joint is formed in the first overlap area to join the first and second parts. A second clinch joint is formed in the second overlap area to join the first and third parts with the third part covering the first clinch joint.

The assembly may further comprise a fourth part overlapping the third part in a third overlap area. A third clinch joint may be formed in the third overlap area to join the third and the fourth part. Alternatively, the third clinch joint may be formed in the third overlap area to join the third part and the fourth part to the first part.

The above aspects of this disclosure and other aspects are described in greater detail below with reference to the attached drawings.

BRIEF DESCRIPTION OF THE DRAWINGS

FIG. 2 is a cross-section view of three panels joined together with several self-piercing rivets in accordance with one example of a method of this disclosure.

FIG. 3 is a cross-section view of four panels joined together with several self-piercing rivets in accordance with another example of a method of this disclosure.

FIG. 4 is a cross-section view of three panels joined together with several clinch joints in accordance with another example of a method of this disclosure.

DETAILED DESCRIPTION

Figure 1A:
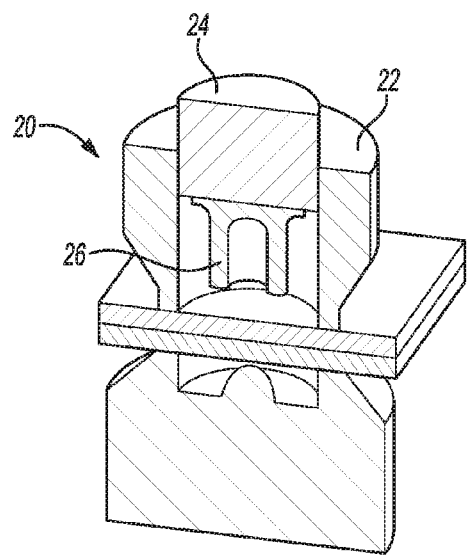
FIG. 1A is a cross-section view of two panels being joined by a self-piercing rivet.
Figure 1B:
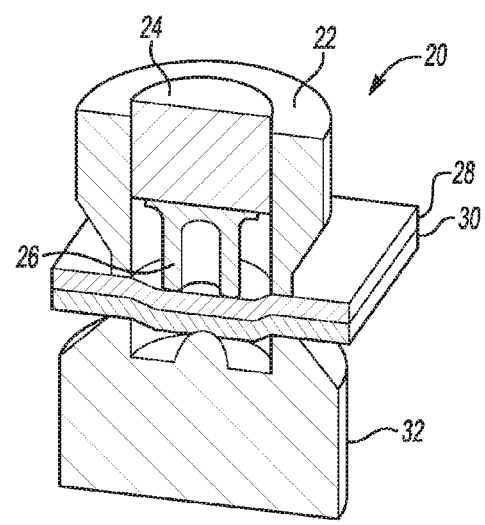
FIG. 1B is the same cross-section view as FIG. 1A showing the punch initially engaging the panels.
Figure 1C:
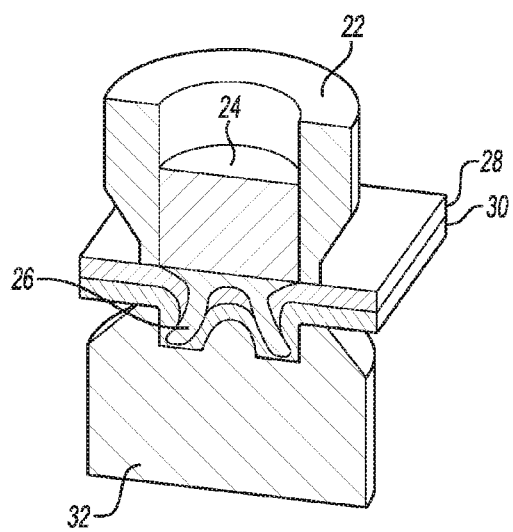
FIG. 1C is the same cross-section view as FIG. 1A showing the rivet being driven through the panels and flared.
Figure 1D:
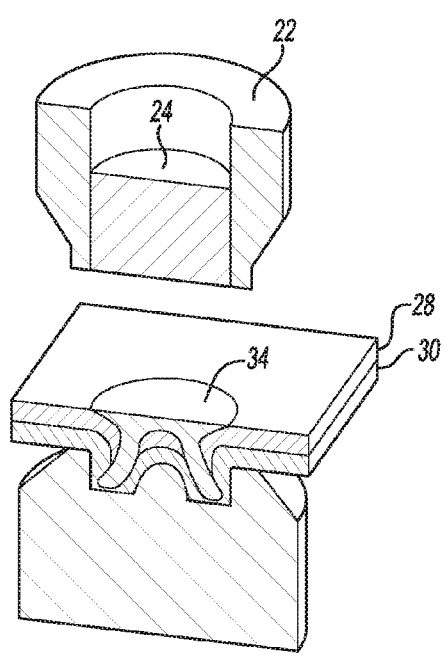
FIG. 1D is the same cross-section view as FIG. 1A showing the nose and punch being retracted from the rivet that secures the panels together.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 2, three metal panels 38, 40, and 42 are joined together using several self-piercing rivets 44, 46, 48, and 50. The sheets may be aluminum sheets and the assembly may be an assembly of mixed metal types. The rivets are spaced apart from each other and are each inserted into two adjacent sheets. First panel 38 and second panel 40 are stacked together in a face-to-face relationship. The first panel 38 is placed or stacked on top of the second panel 40. A first self-piercing rivet 44 is driven through a first attachment point 52 on the first panel 38 and into the second panel 40. The first attachment point 52 is an area where the first panel 38 and the second panel 40 overlap. The first panel 38 does not define a hole prior to being pierced by the first self-piercing rivet 44. The first self-piercing rivet 44 has a head 54 that is flush with a top surface 59 of the first panel 38. The first panel 38 and the second panel 40 are joined by the first self-piercing rivet 44 to form a first sub-assembly 60.

A second self-piercing rivet 48 also connects the first panel 38 and the second panel 40. The second self-piercing rivet 48 pierces the first panel 38 at a second attachment point 56. The second attachment point 56 is spaced from the first attachment point 52. The first panel 38 need not define a hole prior to being pierced by the second self-piercing rivet 48. The second self-piercing rivet 48 has a head 58 that is flush with the top surface 59 of the first panel 38. Additional self-piercing rivets may be used to join other areas of the first sub-assembly 60.

A third panel 42 is stacked in a face-to-face relationship with the first panel 38 of the first subassembly. The third panel 42 covers the heads 54 and 58 of the self-piercing rivets 44 and 48, respectively. The third panel 42, first panel 38, and second panel 40 are stacked together. A third self-piercing rivet 46 pierces the third panel 42 at a third attachment point 62. The third attachment point 62 is an area on a surface of the third panel 42 that does not define a hole prior to being pierced by the third self-piercing rivet 46. The third attachment point 62 is spaced from and not aligned with the first attachment point 52 and the second attachment point 56. The third self-piercing rivet 46 has a head 64 that is flush with the top surface 65 of the third panel 42. The third self-piercing rivet 46 pierces through the third panel 42 and the first panel 38 but does not pierce through the second panel 40. Additional panels may be attached to the assembly. For example, a fourth panel may be assembled in like manner over the third panel.

A fourth self-piercing rivet 50 also pierces through the third panel 42 at a fourth attachment point 66. The fourth attachment point 66 is an area on a surface of the third panel 42 that does not define a hole prior to being pierced by the fourth self-piercing rivet 50. The fourth attachment point 66 is spaced from and not aligned with the first attachment point 52, the second attachment point 56, and the third attachment point 62. The fourth self-piercing rivet 50 has a head 68 that is flush with the top surface 65 of the third panel 42. The fourth self-piercing rivet 50 pierces through the third panel 42 and the first panel 38 but does not pierce through the second panel 40.

Referring to FIG. 3, another assembly 70 is shown that includes four panels 72, 74, 76, and 78 that are joined together by self-piercing rivets 80, 82, 84, and 86. Panel 72 is stacked in a face-to-face relationship with panel 74. Panel 72 is attached to panel 74 using a self-piercing rivet 80 at attachment point 88 and another self-piercing rivet 82 at attachment point 90. Attachment points 88 and 90 are spaced apart from each other. Attachment points 88 and 90 do not define any holes before being pierced with their respective self-piercing rivets. The self-piercing rivets 88 and 90 are pierced through panels 72. Self-piercing rivets 88 and 90 have heads, 92 and 94, respectively, that are flush with a top surface 95 of panel 72 and their bodies, 96 and 98 respectively, are flared within panel 74. Any number of self-piercing rivets may be used to join panels 72 and 74.

Panels 72 and 74 form a sub-assembly 100. Panel 76 is stacked on the sub-assembly 100 on one side of panel 72. The panels may comprise flanges of larger parts that are arranged in a face-to-face relationship. Panels 76 and 78 are stacked together for assembly on panel 72 of a sub-assembly 100 in a face-to-face relationship. A self-piercing rivet 84 pierces through panels 78, 76, and 72 at attachment point 102. Another self-piercing rivet 86 pierces through panels 78, 76, and 72 at attachment point 104. Self-piercing rivets 86 may be a longer rivet if it is to be inserted into three or more panels. While FIG. 3 shows the rivet 86 being inserted into three panels, it may be inserted into two panels in a three panel assembly. Self-piercing rivets 80, 82, 84 and 86 join all four panels together. Attachment points 102 and 104 are spaced from each other and are areas on panel 78 that do not define holes prior to being pierced. The length of the self-piercing rivet depends upon the number, material and gauge of the panels that are to be joined together. For example, self-piercing rivets 84 and 86 pierce through two or three panels but not all four panels. The self-piercing rivets 84 and 86 combine with self-piercing rivets 80 and 82 to join all four panels together.

Referring to FIG. 4, an assembly 112 similar to the three panel assembly of FIG. 2 is shown. The panels in assembly 112 are joined by clinching instead of using self-piercing rivets to join the panels. Panel 106 is placed or stacked on panel 108 in a face-to-face relationship. Panels 106 and 108 are joined by clinching at a first overlap area 114 and at a second overlap area 116. The first overlap area 114 is spaced from the second overlap area 116. The number of overlap areas that can be clinched to join panels 106 and 108 may be varied. Panels 106 and 108 form a sub-assembly 118.

Panel 110 is placed on panel 106 of sub-assembly 118 in a face-to-face relationship. Panel 110 and sub-assembly 118 are joined by clinching them at overlap areas 120 and 122. Overlap areas 114, 120, 116, and 122 are spaced apart. Additional panels may be added to the assembly 112 and clinched at overlap areas that are spaced from other clinch joints.

The assemblies formed from the several methods described above include panels that are interlocked by self-piercing rivets or clinch joints. The number of panels to be joined is not limited by the length of the rivets or by the depth of the clinch joints. The assemblies and methods of the present disclosure enable the assembly of three or more panels efficiently with joints made by multiple self-piercing rivets or multiple clinch joints. The assemblies and methods of the present disclosure may minimize or eliminate the problem of adhesives contaminating the riveting equipment and causing assembly downtime.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of attaching a plurality of panels together comprising:
    assembling a first panel and a second panel together in a face-to-face relationship;
    clinching the first panel and the second panel at a first attachment point to form a sub-assembly;
    assembling a third panel over the first panel covering the first attachment point;
    clinching the third panel and the sub-assembly at a second attachment point that is spaced from the first attachment point.

2. A method of assembling multiple parts comprising:
    clinching a first flange and a second flange in a first set of locations;
    assembling a third flange over the first flange; and
    clinching the third flange and the first flange in a second plurality of locations that are spaced from the first set of locations.

3. The method of claim 2, further comprising:
    assembling a fourth flange over the third flange; and
    clinching the fourth flange and the third flange in a third plurality of locations that are spaced from the second plurality of locations.

4. An assembly comprising:
    a first part;
    a second part overlapping the first part in a first overlap area;
    a third part overlapping the first part in a second overlap area;
    a first clinch joint formed in the first overlap area to join the first and second parts; and
    a second clinch joint formed in the second overlap area to join the first and third parts with the third part covering the first clinch joint.

5. The assembly of claim 4, further comprising:
    a fourth part overlapping the third part in a third overlap area; and
    a third clinch joint formed in the third overlap area to join the third and the fourth part.

6. The assembly of claim 5, wherein the third clinch joint formed in the third overlap area joins the third part and the fourth part to the first part.

* * * * *